United States Patent [19]
Klosterhaus

[11] Patent Number: 5,251,717
[45] Date of Patent: Oct. 12, 1993

[54] HYDRAULIC RACK AN PINION STEERING ASSEMBLY

[75] Inventor: Edwin G. Klosterhaus, Livonia, Mich.

[73] Assignee: TRW Inc., Lyndhurst, Ohio

[21] Appl. No.: 717,324

[22] Filed: Jun. 18, 1991

[51] Int. Cl.$^5$ .............................................. B62D 5/06
[52] U.S. Cl. .................................. 180/148; 180/154; 180/160
[58] Field of Search ............... 180/148, 132, 147, 154, 180/155, 158, 159, 160, 161, 162, 163; 60/403

[56] References Cited

U.S. PATENT DOCUMENTS

| | | | |
|---|---|---|---|
| 1,872,714 | 8/1932 | Farley | 180/163 X |
| 3,605,933 | 9/1971 | Millard . | |
| 3,951,045 | 4/1976 | Frei et al. | 180/155 X |
| 4,418,781 | 12/1983 | Rabe et al. | 180/155 |
| 4,527,465 | 7/1985 | Yoshida et al. | 180/148 X |
| 4,629,026 | 12/1986 | Rosell . | |
| 4,702,333 | 10/1987 | Lippert . | |
| 4,953,653 | 9/1990 | Klosterhaus | 180/148 |
| 4,986,382 | 1/1991 | Harrison | 180/148 |

FOREIGN PATENT DOCUMENTS 1275617 5/1972 United Kingdom .
1387176 3/1975 United Kingdom .

Primary Examiner—Margaret A. Focarino
Assistant Examiner—Peter C. English
Attorney, Agent, or Firm—Tarolli, Sundheim & Covell

[57] ABSTRACT

A hydraulic rack and pinion steering assembly for steering a pair of steerable vehicle wheels comprises a housing defining a passage, an elongate rack supported for longitudinal movement in opposite directions in the passage, and a pinion. The rack has opposite ends connectable with a pair of steerable vehicle wheels, and has rack teeth extending in a row along the rack. The pinion is engaged with the rack teeth. First and second pistons supported on the rack for movement with the rack define movable boundary walls of respective first and second hydraulic chambers in the passage. The pistons have lengths measured along the rack. The row of rack teeth is located axially between the first and second pistons, and is movable in the first and second hydraulic chambers upon movement of the rack in the passage. The rack has a total length equal to the sum of the lengths of the pistons, plus the axial distance between the pistons.

11 Claims, 4 Drawing Sheets

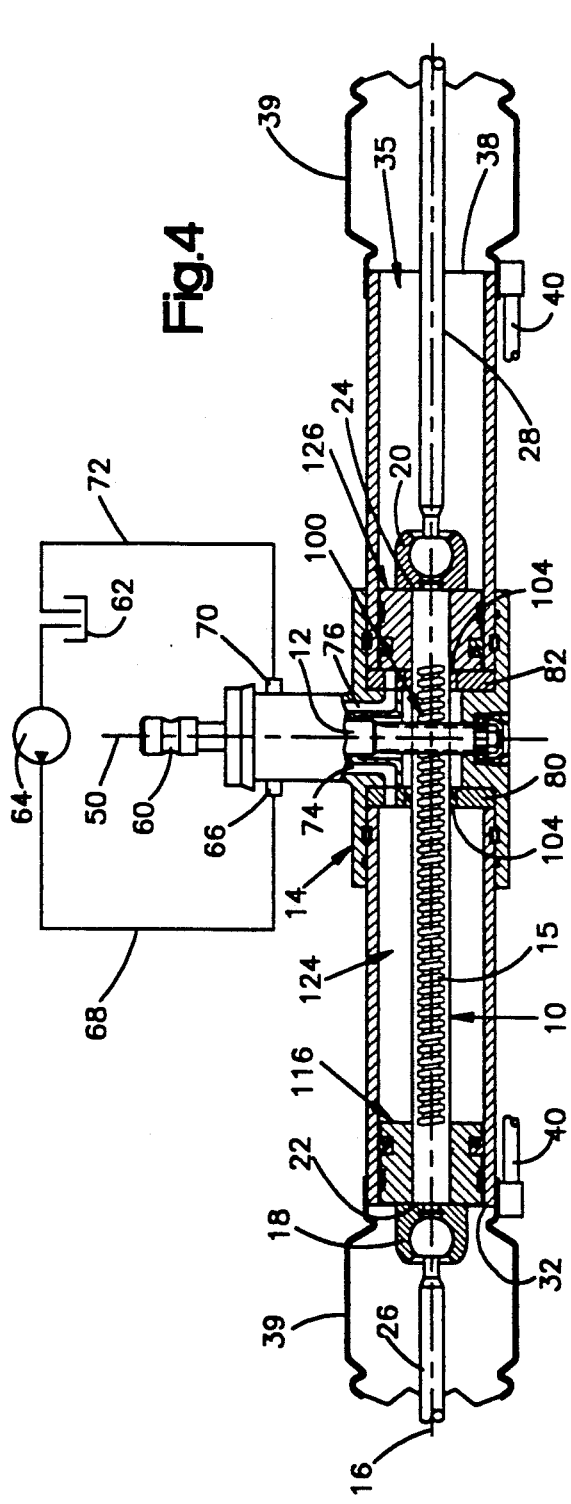
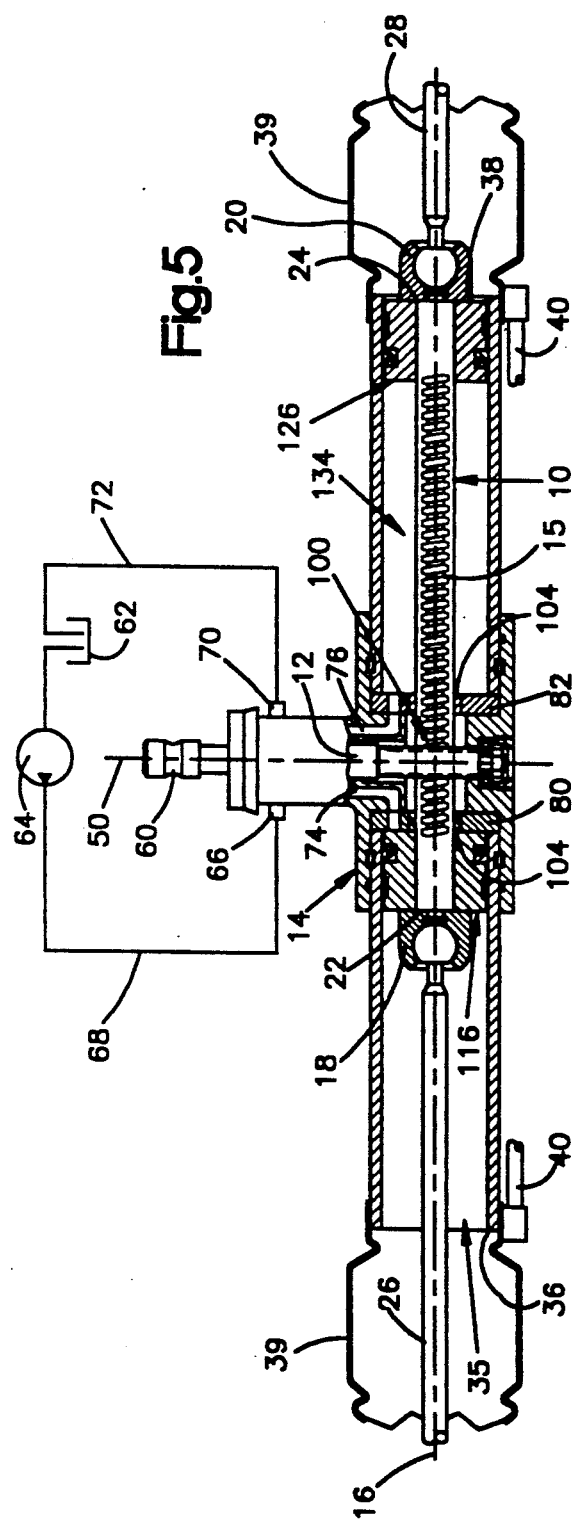

HYDRAULIC RACK AN PINION STEERING ASSEMBLY

FIELD OF THE INVENTION

The present invention relates to a hydraulic rack and pinion steering assembly for steering a pair of steerable vehicle wheels.

BACKGROUND OF THE INVENTION

U.S. Pat. No. 4,953,653 discloses a hydraulic rack and pinion steering assembly for steering a pair of steerable vehicle wheels. The assembly includes an elongate rack supported for longitudinal movement. The rack has opposite ends connectable with the pair of steerable vehicle wheels, and has rack teeth in meshing engagement with a pinion. A hydraulic motor moves the rack longitudinally to effect steering movement of the vehicle wheels. The hydraulic motor comprises a piston fixed to the interior of a housing through which the rack extends, and a pair of end walls fixed to the rack on opposite sides of the piston. The rack has a total length defined in part by the rack teeth, and in part by the distance between the two end walls of the hydraulic motor.

SUMMARY OF THE INVENTION

In accordance with the present invention, a hydraulic rack and pinion steering assembly for steering a pair of steerable vehicle wheels comprises an elongate rack having teeth in meshing engagement with a pinion. The rack is supported for longitudinal movement in opposite directions, and has opposite ends connectable with the pair of steerable vehicle wheels.

The steering assembly further comprises an input shaft, a hydraulic valve and a hydraulic motor. The input shaft rotates in response to rotation of a vehicle steering wheel, and rotates relative to the pinion in response to steering torque. The hydraulic valve responds to relative rotation of the input shaft and the pinion to control a flow of pressurized hydraulic fluid to the hydraulic motor. The hydraulic motor moves the rack longitudinally in opposite directions.

The hydraulic motor comprises a housing and first and second pistons supported on the rack for movement with the rack. The first and second pistons, with seals located near the center of the housing, define first and second variable volume hydraulic chambers in the housing. The pistons have lengths measured along the rack. The rack teeth are located axially between the pistons, and move in the first and second variable volume hydraulic chambers upon movement of the rack. The total length of the rack is equal to the sum of the lengths of the pistons plus the axial distance between the pistons.

The preferred embodiment of the present invention further comprises first and second stationary wall members which support the seals near the center of the housing. The first and second stationary wall members respectively define stationary boundary walls of the first and second variable volume hydraulic chambers. A central hydraulic chamber having a fixed volume is defined in the space between the first and second stationary wall members.

BRIEF DESCRIPTION OF THE DRAWINGS

The foregoing and other features of the present invention will become apparent to those skilled in the art upon reading the following description of preferred embodiments of the invention in view of the accompanying drawings, wherein:

FIGS. 4 and 5 are views of the assembly of FIG. 1, showing parts in different positions.

DESCRIPTION OF PREFERRED EMBODIMENTS

Figure 1:
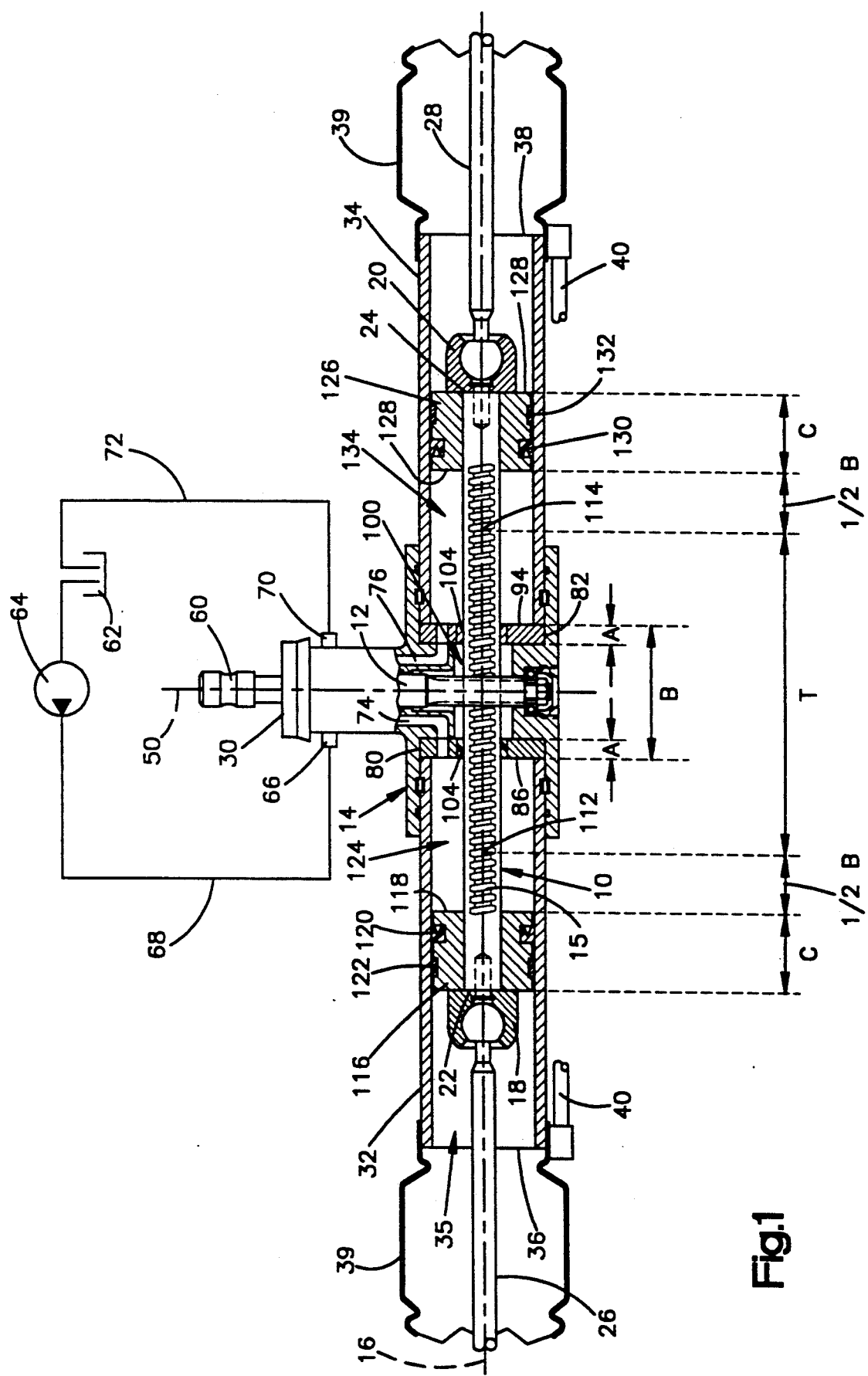
FIG. 1 is a partly schematic sectional view of a hydraulic rack and pinion steering assembly constructed in accordance with the present invention.

As shown in FIG. 1, a hydraulic rack and pinion steering assembly constructed in accordance with a preferred embodiment of the present invention comprises an elongate rack 10 and a pinion 12 in a housing 14. The rack 10 has rack teeth 15 engaged with the pinion 12, and is supported for longitudinal movement in opposite directions relative to the housing 14 along a longitudinal axis 16. A pair of ball joints 18 and 20 connect opposite ends 22 and 24 of the rack 10 with tie rods 26 and 28 of a vehicle steering linkage. The tie rods 26 and 28 are connected with an associated pair of steerable vehicle wheels (not shown). The rack 10 is thus connected to the steerable vehicle wheels to cause pivoting movement of the steerable vehicle wheels upon longitudinal movement of the rack 10.

The rack 10 is preferably formed of SAE 1040 steel, cold drawn and annealed. The rack teeth 15 are cut from solid in a machining process known as broaching, and the rack 10 is induction hardened to a case depth of 1.5 mm. The pinion 12 is preferably formed of SAE 8115 steel, cold drawn and annealed. A pinion blank is machined from bar stock and gear teeth are cut in a hobbing operation. The pinion 12 is induction hardened to case depth of 1.5 mm. Specifications for the ball joints 18, 20 and the tie rods 26, 28 will vary depending upon the application of the steering assembly.

The housing 14 has a central portion 30 and a pair of tubular portions 32 and 34 centered on the longitudinal axis 16. An elongate passage 35 extends between opposite ends 36 and 38 of the housing 14. Bellows 39 are connected between the opposite ends 36 and 38 of the housing 14 and the associated tie rods 26 and 28 to seal the passage 35 against the entry of dirt or other contaminants. The bellows 39 are expandable and contractible upon movement of the tie rods 26 and 28 with the rack 10, and communicate with each other through a pneumatic line 40.

The central portion 30 of the housing 14 is preferably formed of die cast aluminum. A blank is formed in a die cast operation, and is then machine bored in various operations to take the shape shown in the figures. The tubular portions 32 and 34 of the housing 14 are preferably formed of SAE 1020 cold rolled welded seam tubing. The bellows 39 are preferably formed of blow-molded Santoprene 101-80, supplied by Wheaton.

The pinion 12 is supported in the housing 14 of rotation about an axis 50. As shown in enlarged detail in FIG. 2, one end of the pinion 12 is supported in a bearing 52. A cap 54 supports the bearing 52 in the housing 14, and supports a lower 0-ring seal 56. An input shaft 60 extending into the housing 14 is connectable with a vehicle steering wheel (not shown). The input shaft 60 is supported for rotation about the axis 50 in response to rotation of the steering wheel by a vehicle occupant. The input shaft 60 is connected with the pinion 12 to rotate slightly (approx. 2°) relative to the pinion 12 in response to steering torque.

The bearing 52 is preferably TRW part no. G-12-BB-1. The cap 54 is similar to TRW part no. G-35-HB-3, but is modified to support the lower 0-ring seal 56. The lower 0-ring seal 56 preferably is an injection molded nitrite O-ring similar to Parker Series 2. The input shaft 60 is preferably formed of SAE 1144 cold drawn steel, machined from bar stock, and induction hardened to a case depth of 1.0 mm.

The steering assembly further comprises a hydraulic circuit including a hydraulic reservoir 62 and a pump 64, as shown schematically in the Figures. The pump 64 communicates with a hydraulic inlet 66 in the housing 14 through a hydraulic supply line 68. The reservoir 62 communicates with a hydraulic outlet 70 in the housing 14 through a hydraulic return line 72.

The specific make and model number for the reservoir 62 and the pump 64 will vary depending upon the specific application of the steering assembly, e.g. vehicle size, etc.

A hydraulic control valve 73 is located in the central portion 30 of the housing 14, as shown schematically in the figures. The hydraulic control valve 73 responds to relative rotation between the input shaft 60 and the pinion 12 in a known manner. When the input shaft 60 rotates relative to the pinion 12 in a first direction, the hydraulic control valve 73 communicates the hydraulic inlet 66 with a first inner hydraulic passage 74 in the housing 14, and communicates the hydraulic outlet 70 with a second inner hydraulic passage 76 in the housing 14. Hydraulic fluid, preferably automatic transmission fluid, then flows under pressure from the pump 64 to the first inner hydraulic passage 74 through the hydraulic supply line 68 and the hydraulic inlet 66. Hydraulic fluid also flows from the second inner hydraulic passage 76 to the reservoir 62 through the hydraulic outlet 70 and the hydraulic return line 72. These flows of hydraulic fluid stop when relative rotation between the input shaft 60 and the pinion 12 returns to zero.

When the input shaft 60 rotates relative to the pinion 12 in the opposite direction, the hydraulic control valve 73 similarly directs hydraulic fluid to flow in opposite directions from the pump 64 to the second inner hydraulic passage 76 via the hydraulic supply line 68 and the hydraulic inlet 66, and from the first inner hydraulic passage 74 to the reservoir 62 via the hydraulic outlet 70 and the hydraulic return line 72. Hydraulic control valves for directing such flows of hydraulic fluid in a hydraulic rack and pinion steering assembly are known in the art. For example, one such known hydraulic control valve is disclosed in U.S. Pat. No. 4,276,812. Preferably, a valve assembly functionally similar to TRW valve assembly no G-30-VA-13-B1, including the pinion 12, the input shaft 60 and the hydraulic control valve 73, is used.

Figure 2:
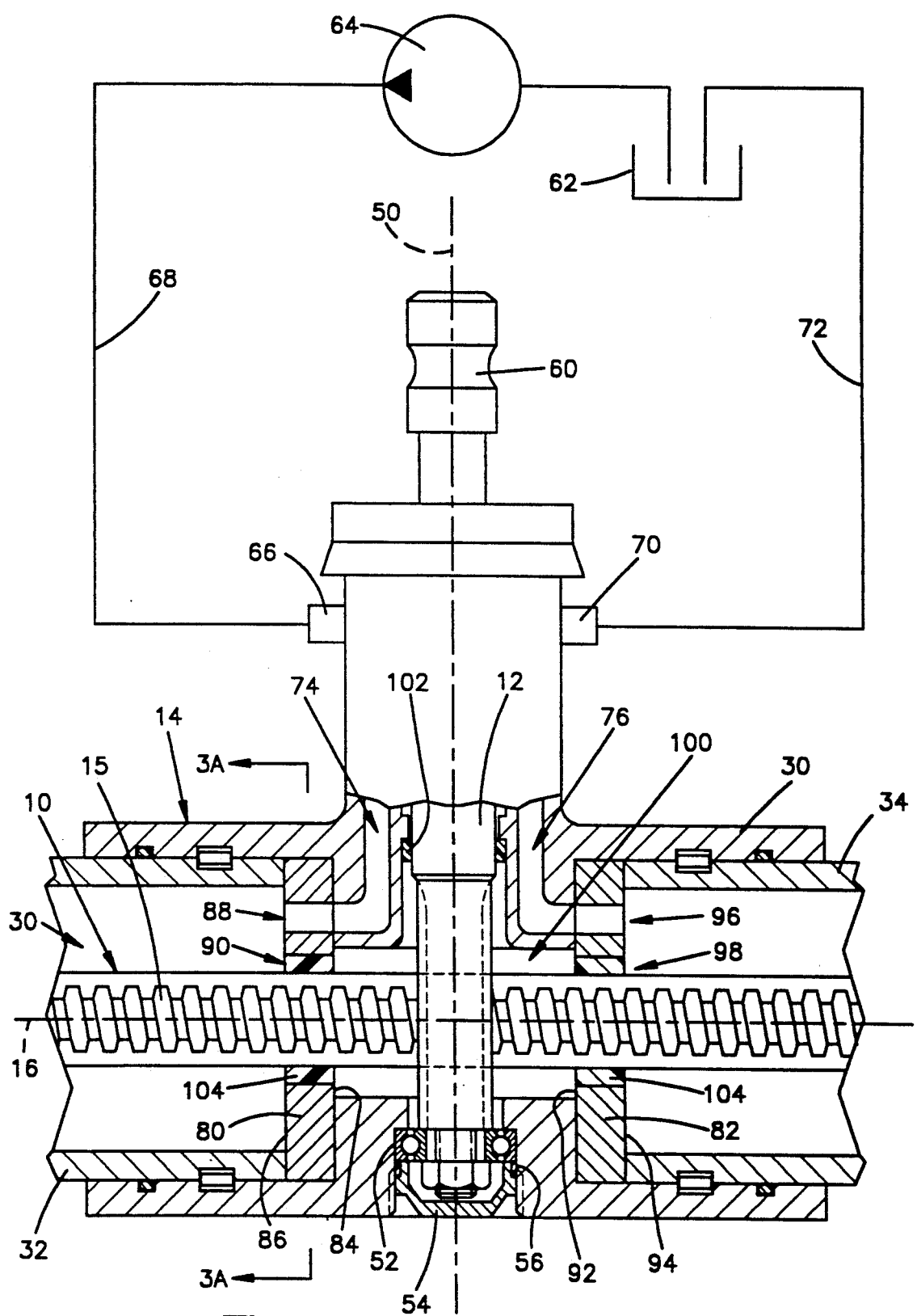
FIG. 2 is an enlarged partial view of the assembly of FIG. 1.

A pair of stationary wall members 80 and 82, preferably formed of steel, are fixed to the central portion 30 of the housing 14 in the passage 35 (see FIG. 2). The first stationary wall member 80 has an inner surface 84 and an outer surface 86. The first stationary wall member 80 also has surfaces defining an upper opening 88 and a central opening 90 which is centered on the longitudinal axis 16. The upper opening 88 communicates with the first inner hydraulic passage 74 in the housing 14. The second stationary wall member 82 has inner and outer surfaces 92 and 94, and likewise has surfaces defining an upper opening 96 and a central opening 98 centered on the longitudinal axis 16. The upper opening 96 communicates with the second inner hydraulic passage 76 in the housing 14.

A central hydraulic chamber 100 having a fixed volume is located between the inner surfaces 84 and 92 of the first and second stationary wall members 80 and 82. The central hydraulic chamber 100 is sealed by the lower seal 56, an upper seal 102, and a pair of rack seals 104 supported in the central openings 90 and 98 in the first and second stationary wall members 80 and 82. The upper seal 102 preferably is an injection molded polyurethane lip seal, similar to Parker Polypak. The rack seals 104 are preferably formed of porous bronze impregnated with Teflon (trademark of E. I. DuPont de Nemours & Co.), similar to Glacier Metal Co. D. U. type bearings. The rack seals 104 can alternately be formed of polyurethane or nitrite elastomers.

The first and second stationary wall members 80 and 82 have equal thicknesses measured along the longitudinal axis 16, as indicated by the dimensions A shown in FIG. 1. The outer surfaces 86 and 94 of the first and second stationary wall members 80 and 82 are axially spaced from each other a distance B. The distance B is equal to the sum of the thicknesses A, plus the axial length of the central hydraulic chamber 100.

Figure 3A:
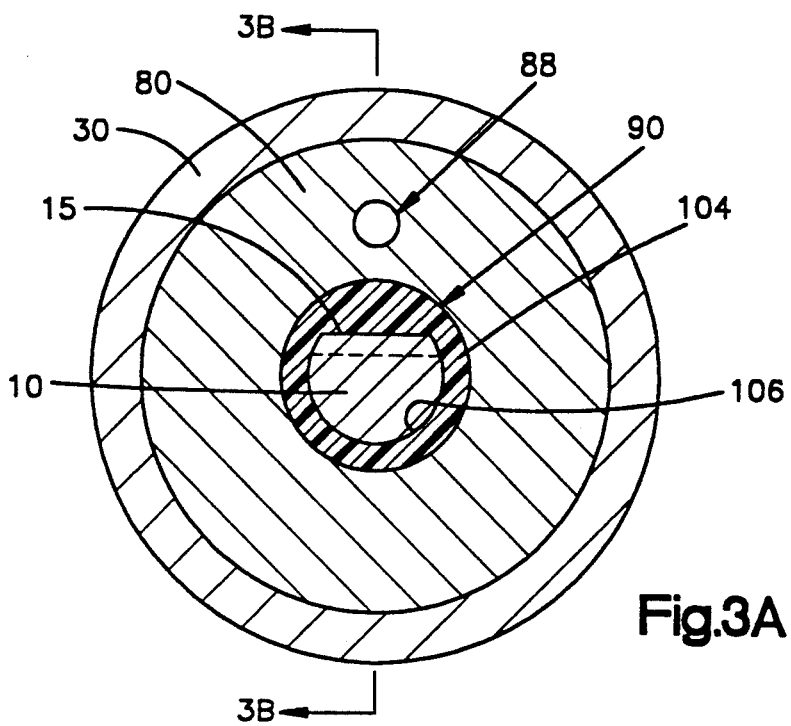
FIG. 3A is a view taken on line 3A—3A of FIG. 2.
Figure 3B:
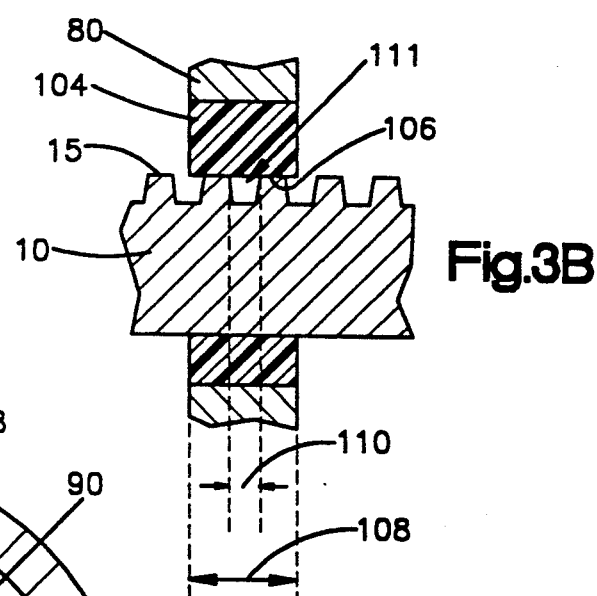
FIG. 3B is a partial sectional view taken on line 3B-3B of FIG. 3A.
Figure 3C:
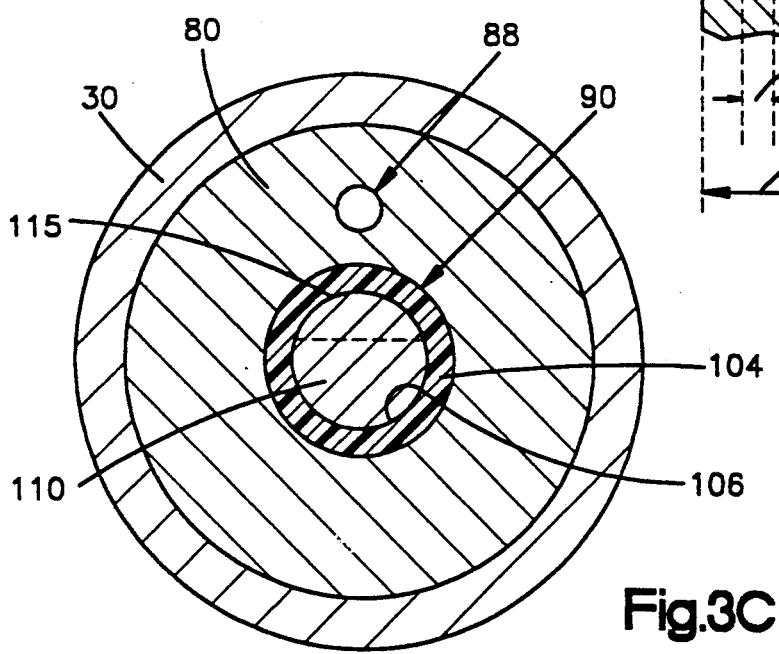
FIG. 3C is a sectional view of a portion of a steering assembly in accordance with an alternate embodiment of the present invention.

As shown in FIG. 3A, the rack 10 has a substantially circular cross-sectional outline shape with a flattened portion defined by the rack teeth 15. Each of the rack seals 104 has an inner surface 106 with a contour complementary to the cross-sectional outline shape of the rack 10. Each inner surface 106 is engaged in sliding contact with the rack 10, and, as shown in FIG. 3B, has an axial dimension 108 greater than the distance 110 across a space 111 between adjacent rack teeth 15. In an alternate embodiment of the invention shown in FIG. 3C, a rack 110 with rack teeth 113, and rack seals 115 with inner surfaces 117, have fully circular cross-sectional shapes, but are otherwise the same as the rack 10 and the rack seals 104 shown in FIGS. 3A and 3B.

The rack teeth 15 extend in a row along the rack 10. A plurality of the rack teeth 15 ar engageable with the pinion 12 upon movement of the rack 10 in the passage 35. As shown in FIG. 1, those rack teeth 15 are located between points 112 and 114 which are spaced from each other a distance T. The distance T is equal to the axial range of movement of the rack 10 in the passage 35. The row of rack teeth 15 extends beyond each of the points 112 and 114 a distance equal to one half of the distance B.

A first piston 116 is fixed to the rack 10 for movement with the rack 10 in the passage 35. The first piston 116 has a first movable end wall surface 118. A hydraulic seal 120 and a guide bearing 122 are supported on the first piston 116 in sliding contact with the first tubular portion 32 of the housing 14. A first variable volume hydraulic chamber 124 is defined between the first movable end wall surface 118 and the outer surface 86 of the first stationary wall member 80.

Preferably, the first piston 116 is formed of aluminum, and the guide bearing 122 is formed of Shamban Slydring of Turcite-46 reinforced PTFE compound. The hydraulic seal 120 is a flexible lip seal formed of polyurethane or nitrite elastomers, possibly containing fillers such as Teflon to reduce friction, and possibly hydrogenated to improve temperature range. Alternately, the first piston 116 can be formed of a structural elastomeric material such as an acetal which can slide in firm contact with the steel first tubular portion 32 of the housing 14 without causing wear. Such an acetal is DuPont Delrin 500 AF (TM). The guide bearing 122 would not be required in such an alternate embodiment of the invention.

A second piston 126 is also fixed to the rack 10 for movement with the rack 10 in the passage 35. The second piston 126 has a second movable end wall surface 128, and supports a hydraulic seal 130 and a guide bearing 132 in sliding contact with the second tubular portion 34 of the housing 16. The second piston 126, the hydraulic seal 130 and the guide bearing 132 are constructed like their counterparts 116, 120 and 122. A second variable volume hydraulic chamber 134 is defined between the second movable end wall surface 128 and the outer surface 94 of the second stationary wall member 82.

The first and second pistons 116 and 126 have equal lengths C measured along the rack 10, and are located on the rack 10 at positions adjoining respective opposite ends of the row of rack teeth 15. The rack 10 does not extend axially beyond the first and second pistons 116 and 126, and thus has a total length equal to the sum of the distances C, plus the distance T, plus the distance B.

During operation of the hydraulic rack and pinion steering assembly, the rack 10 is moved in opposite directions in the passage 35 along the longitudinal axis 16. The rack 10 has a centered position shown in FIG. 1, an extreme leftward position shown in FIG. 4, and an extreme rightward position shown in FIG. 5.

When the input shaft 60 rotates relative to the pinion 12 in one direction, the hydraulic control valve directs hydraulic fluid to flow under pressure from the pump 64 to the first inner hydraulic passage 74 in the housing 14, and simultaneously directs hydraulic fluid to flow from the second inner hydraulic passage 76 to the reservoir 62, as described above. Hydraulic fluid then flows into the first variable volume hydraulic chamber 124 and out of the second variable volume hydraulic chamber 134. Such flows of hydraulic fluid cause the rack 10 to move from the centered position shown in FIG. 1 toward the extreme leftward position shown in FIG. 4.

Movement of the rack 10 to the left past the position shown in FIG. 4 is prevented by impact of the second piston 126 with the second stationary wall member 82. The axial distance of one half B between the second piston 126 and the point 114 on the row of rack teeth 15 (FIG. 1) permits the rack teeth 15 to the left of the point 114 to move into the central hydraulic chamber 100 as required to reach the pinion 12.

When the input shaft 60 rotates relative to the pinion 12 in the opposite direction, the hydraulic control valve directs hydraulic fluid to flow under pressure from the pump 64 to the second inner hydraulic passage 76 in the housing 14, and simultaneously directs hydraulic fluid to flow from the first inner hydraulic passage 74 to the reservoir 62, as described above. Hydraulic fluid then flows into the second variable volume hydraulic chamber 134 and out of the first variable volume hydraulic chamber 124. Such flows of hydraulic fluid move the rack 10 toward the extreme rightward position shown in FIG. 5.

Movement of the rack 10 to the right past the position shown in FIG. 5 is prevented by impact of the first piston 116 with the first stationary wall member 80. The axial distance of one half B between the first piston 116 and the point 112 on the row of rack teeth 15 (FIG. 1) permits the rack teeth 15 to the right of the point 112 to move into the central hydraulic chamber 100 as required to reach the pinion 12.

When the rack 10 moves through the central openings 90 and 98 in the first and second stationary wall members 80 and 82, a plurality of the rack teeth 15 slide against the inner surfaces 106 of the rack seals 104, as indicated in FIGS. 3A and 3B. The rack seals 104 block the flow of hydraulic fluid between the central hydraulic chamber 100 and the first and second variable volume hydraulic chambers 124 and 134. However, the rack 10 carries volumes of hydraulic fluid in the spaces 111 between adjacent rack teeth 15. Such volumes of hydraulic fluid are moved by the rack 10 between the central hydraulic chamber 100 and the first and second variable volume hydraulic chambers 124 and 134. Because the row of rack teeth 15 extends axially beyond each of the points 112 and 114 a distance of one half B, the rack teeth 15 always move simultaneously and equally through the two rack seals 104, as shown in FIGS. 1, 4 and 5, and the sealing effect of the rack seals 104 is unchanged throughout movement of the rack 10. Therefore, the volume of hydraulic fluid moved into the central hydraulic chamber 100 is substantially equal to the volume of hydraulic fluid moved out of the central hydraulic chamber 100. The volume of hydraulic fluid in the central hydraulic chamber 100 thus remains substantially constant.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a housing defining a passage;
   first and second wall members fixed to said housing in said passage, said wall members being spaced from each other and defining a first hydraulic chamber in said housing between said wall members, each of said wall members having an opening therethrough;
   a pinion supported for rotation in said first hydraulic chamber;
   an elongate rack having rack teeth engaged with said pinion, said rack extending through said openings in said first and second wall members and being supported for longitudinal movement in said passage;
   a first piston fixed to said rack for movement in said passage with said rack, said first piston defining a second hydraulic chamber in said housing extending from said first piston and to first wall member; and
   a second piston fixed to said rack for movement in said passage with said rack, said second piston defining a third hydraulic chamber in said housing extending from said second piston to said second wall member.

2. Apparatus as defined in claim 1 wherein said rack has an axis and an axially extending row of rack teeth movable in said openings in said first and second wall members.

3. Apparatus as defined in claim 2 further comprising first and second seal members each having a sealing surface in slidable contact with said rack and extending around the periphery of said rack, said first seal member being supported in said opening in said first wall member, said second seal member being supported in said opening in said second wall member.

4. Apparatus as defined in claim 3 wherein a pair of adjacent rack teeth in said row are movable in sliding contact with at least one of said sealing surfaces, each of said sealing surfaces having an axial dimension greater than the axial distance across the space between said adjacent rack teeth, whereby said sealing surfaces block the flow of hydraulic fluid through said openings in said first and second wall members between said sealing surfaces and said adjacent rack teeth, and permit said rack to carry a volume of hydraulic fluid axially past said sealing surfaces in said space between said adjacent rack teeth.

5. Apparatus as defined in claim 4 wherein said rack has opposite ends connectable with a pair of steerable vehicle wheels.

6. Apparatus as defined in claim 1 wherein said rack has a range of longitudinal movement in said passage, said first and second wall members having lengths measured along said rack, said first and second pistons being axially spaced from each other a distance equal to the sum of said lengths of said wall members, plus the axial length of said first hydraulic chamber, plus the axial length of said range of longitudinal movement of said rack in said passage.

7. Apparatus as defined in claim 6 wherein said first and second pistons have lengths measured along said rack, said rack having a total length equal to the sum of said lengths of said pistons plus the axial distance between said pistons.

8. Apparatus as defined in claim 7 wherein said rack has opposite ends connectable with a pair of steerable vehicle wheels.

9. A hydraulic rack and pinion steering assembly for steering a pair of steerable vehicle wheels, said steering assembly comprising:
   a housing defining a passage;
   an elongate rack supported for longitudinal movement in said passage, said rack having opposite ends connectable with a pair of steerable vehicle wheels, and having rack teeth extending along said rack;
   a pinion gear having teeth in meshing engagement with said rack teeth;
   an input shaft rotatable in response to steering input of a vehicle occupant, said input shaft being rotatable relative to said pinion;
   first and second pistons fixed to said rack for movement in said passage with said rack, said first and second pistons being movable boundary walls of respective first and second hydraulic chambers;
   a hydraulic valve responsive to relative rotation of said input shaft and said pinion to control a flow of pressurized hydraulic fluid to said hydraulic chambers;
   said rack teeth being located between said first and second pistons, and being movable in said first and second hydraulic chambers upon movement of said rack in said passage, said rack having a total length equal to the sum of the lengths of said pistons measured along said rack plus the distance between said pistons;
   first and second stationary wall members in said passage, said first and second stationary wall members respectively being stationary boundary walls of said first and second hydraulic chambers, each of said first and second stationary wall members having an opening therethrough, said rack extending through said openings;
   a third hydraulic chamber defined in a space between said first and second stationary wall members; and
   sealing means for permitting hydraulic fluid in said first and second hydraulic chambers to move in substantially equal amounts into and out of said third hydraulic chamber upon movement of said rack in said passage.

10. An assembly as defined in claim 9 wherein said rack has a cross-sectional outline shape defined in part by said rack teeth, said sealing means comprising a sealing surface in slidable contact with said rack, said sealing surface extending around the periphery of said rack and having a contour complementary to said cross-sectional outline shape of said rack.

11. An assembly as defined in claim 10 wherein spaces are located between adjacent rack teeth, said rack containing quantities of hydraulic fluid in said spaces and carrying said quantities of hydraulic fluid axially across said sealing surface upon movement of said rack in said passage.

* * * * *